(12) United States Patent
Tirunagari et al.

(10) Patent No.: US 11,815,185 B2
(45) Date of Patent: Nov. 14, 2023

(54) NON-PUSHER DRY RUNNING SEAL WITH SEALING ELASTOMER AS A BACKUP IN SLIDING SEAL SYSTEM

(71) Applicant: John Crane Inc., Chicago, IL (US)

(72) Inventors: Prashanthi Tirunagari, Deerfield, IL (US); James R. Wasser, Lake Forest, IL (US)

(73) Assignee: JOHN CRANE INC., Morton Grove, IL (US)

( * ) Notice: Subject to any disclaimer, the term of this patent is extended or adjusted under 35 U.S.C. 154(b) by 0 days.

(21) Appl. No.: 17/898,864

(22) Filed: Aug. 30, 2022

(65) Prior Publication Data

US 2023/0074820 A1 Mar. 9, 2023

Related U.S. Application Data

(60) Provisional application No. 63/238,313, filed on Aug. 30, 2021.

(51) Int. Cl.
  *F16J 15/36* (2006.01)
  *F16J 15/34* (2006.01)
  *F16J 15/00* (2006.01)

(52) U.S. Cl.
  CPC .............. *F16J 15/36* (2013.01); *F16J 15/004* (2013.01); *F16J 15/348* (2013.01); *F16J 15/3452* (2013.01)

(58) Field of Classification Search
  CPC ........ F16J 15/002; F16J 15/004; F16J 15/344; F16J 15/348; F16J 15/3484; F16J 15/36
  See application file for complete search history.

(56) References Cited

U.S. PATENT DOCUMENTS

| | | | | |
|---|---|---|---|---|
| 2,467,960 | A | * | 4/1949 | Brady, Jr. ............ F16J 15/3484 277/374 |
| 2,712,459 | A | * | 7/1955 | Wahl ..................... F04D 29/126 277/374 |
| 6,142,478 | A | * | 11/2000 | Pecht ................... F16J 15/3484 277/400 |
| 10,634,250 | B2 | * | 4/2020 | Rasmussen ............ F16J 15/002 |
| 11,473,680 | B2 | * | 10/2022 | Rasmussen .............. F16J 15/36 |
| 2011/0101617 | A1 | * | 5/2011 | Suefuji ................ F16J 15/3484 277/361 |
| 2018/0017161 | A1 | * | 1/2018 | Rasmussen .............. F16J 3/041 |
| 2019/0331227 | A1 | | 10/2019 | Itadani et al. |
| 2020/0232562 | A1 | * | 7/2020 | Rasmussen ............ F16J 15/363 |
| 2022/0205540 | A1 | * | 6/2022 | Wasser ................... F16J 15/344 |
| 2023/0028905 | A1 | * | 1/2023 | Rasmussen ............ F16J 15/348 |

* cited by examiner

*Primary Examiner* — Nicholas L Foster
(74) *Attorney, Agent, or Firm* — CANTOR COLBURN LLP

(57) ABSTRACT

A mechanical seal assembly adapted for arrangement around a rotating shaft of a pump has first and second seals. Both include primary and mating rings, biasing mechanisms and annular flexible sealing membranes. The two seals can have different seal balances or different biasing forces (or both) to allow the second seal to run dry for extended periods.

14 Claims, 6 Drawing Sheets

NON-PUSHER DRY RUNNING SEAL WITH SEALING ELASTOMER AS A BACKUP IN SLIDING SEAL SYSTEM

CROSS REFERENCE TO RELATED APPLICATIONS

This application claims the benefit of U.S. Provisional Application No. 63/238,313 filed Aug. 30, 2021, which is hereby incorporated herein in its entirety by reference.

FIELD

Exemplary embodiments pertain to the art of dry gas seals and, in particular to non-pusher dry running seals that can be used as a containment seal for a primary seal.

BACKGROUND

There are several types of seals that can be used to provide a seal between a rotating shaft and a stationary housing of a pump, compressor, turbine, or other rotating machine. One example is an end face mechanical seal. Such seal includes a seal interface formed of two faces that contact one another. In operation one of the faces rotates with the rotating shaft and the other is held in a fixed position. The Hydrostatic and hydrodynamic pressure on the seal faces can generate a film gap to form between the two faces leading to excessive leakage. Accordingly, such seals require regular adjustment in order to maintain the appropriate or axial position of the faces relative to one another to account for the wear while still maintaining a relatively leak-free seal. Of course, some leakage can occur regardless of how well the faces are manipulated.

Various biasing mechanisms have been contemplated to provide a closing force to automatically accommodate wear and push the seal faces together. Such biasing mechanism have included single and multiple coil springs, and metal bellows. The skilled artisan will realize that the total closing force is actually a combination of hydraulic force from the sealed fluid and force provided by the biasing mechanism.

If the seal faces are rotated against each other without some form of lubrication, face friction would generate excessive heat causing early failure. For this reason, some form of lubrication is required between the rotary and stationary seal face. In a typical mechanical seal, the faces are kept lubricated by the formation of a thin film of fluid between the seal faces. This film can either come from the process fluid being pumped/compressed or from an external source.

One type of seal that includes two faces is a so-called "pusher seal." In a pusher seal a dynamic secondary seal (such as an O-ring) is provided to form a seal between the shaft (or an element connected to the shaft) and the face that moves axially relative to the shaft so that fluid cannot bypass the faces and escape. Axial movement of the face can lead to fretting or shredding of the secondary seal due to friction.

Another type of seal employs convoluted elastomer bellows. Instead of an O-ring, this type of seal uses a spring-loaded bellows instead of an O-ring. Such seal can sometimes be difficult to implement in high-pressure operating condition.

In cases where there is no fluid or gas is being pumped, blown or the like, a dry running mechanical seal can be used. A dry running mechanical seal includes two rings that define the faces rotate relative to one another.

The rotating ring is sometimes referred to as a "mating ring" as it is mated to the rotating shaft/rotor. The rotating ring can be mated to the rotor via a shaft sleeve. The stationary ring can sometimes be referred to as the primary ring and does not rotate during operation.

In operation, during the initial short run-in time, the material transfers between the rings and the friction is reduced. The mating ring is designed to effectively dissipate the heat generated at the rings. Similar to the above, to allow for relative axial movement between the rings, the primary ring is typically mounted to a stationary portion of the dry running mechanical seal by a compressible member such as a spring or other implement.

SUMMARY

Disclosed in one embodiment is a mechanical seal assembly. The dry running mechanical seal is used in combination with a primary seal as a containment or "back-up" seal.

In one embodiment, the seal is adapted for arrangement around a rotating shaft and includes a primary ring and a mating ring. The primary ring is axially shiftable relative to the rotating shaft and the mating ring is axially fixable relative to the rotating shaft. The seal also includes a biasing mechanism that urges the primary ring toward the mating ring and an annular flexible sealing membrane.

The annular flexible sealing membrane seals fluid from going around the seal and without the limitations of the O-rings. The annular flexible sealing membrane used herein does not collapse like the traditional elastomer. This may result in the non-contacting retaining constant (or near constant) seal balance and face load constant throughout the seal operation, even in high-pressure situations.

In one embodiment, the annular flexible sealing membrane includes a flange portion disposed at least partially between the biasing mechanism and the primary ring, a coaxial portion that is axially fixable relative to the shaft and a flexible connection portion positioned within a radially inward extent of the first flange portion and connecting the first flange portion to the first coaxial portion.

As more fully discussed below, in some cases the primary seal is any type of rotating seal that can create a seal around rotating shaft (e.g., of a pump) and that includes two faces/rings that are rotatable relative to one another and that utilize a liquid for lubrication.

Further, in one embodiment, the coaxial portion of the annular flexible sealing membrane and some or all of the flexible connection portion are supported by annular stub sleeve. This prevents or reduces any collapsing of the annular flexible sealing membrane and keeps the containment seal in an operationally advantageous state, regardless of pressure or operating condition of the primary seal. Of course, the stub sleeve could be replaced with another element that supports the annular flexible sealing membrane As the containment seal is operating with less than normal lubrication (e.g., only that which passes through the primary), as compared to the primary seal the containment seal can have one or both of up to 14% lower seal balance (4-14% in one embodiment) and has lightly loaded springs with at most 10% of the face spring pressure to reduce the heat generated at interface to improve the seal life.

In one embodiment, the primary ring can be made of a carbon that includes some graphite (to reduce friction, and thus heat generation). The mating ring can be made of Silicon Carbide.

In one embodiment, a mechanical seal assembly adapted for arrangement around a rotating shaft of a pump is disclosed. The seal assembly includes first and second seals. The first seal includes: a first primary ring and a first mating ring, the first primary ring being axially shiftable relative to the rotating shaft and the first mating ring being axially fixable relative to the rotating shaft; a first biasing mechanism that urges the first primary ring toward the first mating ring, the first biasing means providing a first biasing force; and a first annular flexible sealing membrane. The membrane can be any membrane disclosed herein. In one embodiment, the membrane includes: a first flange portion disposed at least partially between the first biasing mechanism and the first primary ring; a first coaxial portion that is axially fixable relative to the shaft; and a first flexible connection portion positioned within a radially inward extent of the first flange portion and connecting the first flange portion to the first coaxial portion. In operation the first biasing means applies the first biasing force to the first primary through the first flange portion to urge the first primary ring toward the first mating ring.

The second seal in this embodiment is in fluid communication with the containment cavity and includes: a second primary ring and a second mating ring, the second primary ring being axially shiftable relative to the rotating shaft and the second mating ring being axially fixable relative to the rotating shaft; a second biasing mechanism that urges the second primary ring toward the second mating ring, the second biasing means providing a second biasing force; and a second annular flexible membrane that includes: a second flange portion disposed at least partially between the second biasing mechanism and the second primary ring; a second coaxial portion that is axially fixable relative to the shaft; and a second flexible connection portion positioned within a radially inward extent of the second flange portion and connecting the second flange portion to the second coaxial portion. In operation the second biasing means applies the second biasing force to the first primary through the second flange portion to urge the second primary ring toward the second mating ring. In this embodiment, wherein the second biasing force is less than 10% of the first biasing force.

In any prior embodiment, the second seal can have up to a 14% lower seal balance than the first seal.

In any prior embodiment, the second seal can have between a 4 and 14% lower seal balance than the first seal.

In any prior embodiment, the first and second seals are disposed in a cartridge.

In any prior embodiment, the cartridge is at least partially disposed in the pump.

In any prior embodiment, the second seal is in fluid communication with the first seal within the cartridge.

In any prior embodiment, the second coaxial portion is arrangable at a diameter within the balance diameter of the seal assembly.

In any prior embodiment, in operation, axial translation of the rotating shaft relative to the second biasing mechanism urges the second flange portion to shift axially inboard and radially inward relative to the second coaxial portion.

In any prior embodiment, in operation, axial translation of the rotating shaft relative to the second biasing mechanism urges the second flange portion to shift axially outboard and radially outward relative to the second coaxial portion.

Also disclosed is mechanical seal assembly adapted for arrangement around a rotating shaft of a pump. The seal in this embodiment can include first and second seals as arranged above. In this second embodiment, wherein the second seal has up to a 14% lower seal balance than the first seal.

In the assembly of the second embodiment, the second seal can have between a 4 and 14% lower seal balance than the first seal.

In the assembly of the second embodiment, the first and second seals are disposed in a cartridge.

In the assembly of the second embodiment, the cartridge is at least partially disposed in the pump.

In the assembly of the second embodiment, the second seal is in fluid communication with the first seal within the cartridge.

In the assembly of the second embodiment, second coaxial portion is arrangable at a diameter within the balance diameter of the seal assembly.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the terms "coupled", "connected" and variations thereof describes having a path for a fluid between two elements and does not imply a direct connection between the elements with no intervening elements/connections between them. However, all connections or couplings can be direct if specifically called out the claims and all instances of such connections/connections can include the description that the connection/coupling (or similar terms) are direct. All of these variations are considered a part of the specification.

DETAILED DESCRIPTION

A detailed description of one or more embodiments of the disclosed apparatus and method are presented herein by way of exemplification and not limitation with reference to the Figures.

Turning now to an overview of technologies that are more specifically relevant to aspects of the invention of the seal is disclosed that can be used for any machine that includes a rotating shaft or as back-up in such machines. Examples of such machines include pumps, mixers, blenders, agitators, compressors, blowers, fans or the like.

The primary seal can be any type of rotating seal that can create a seal around a rotating shaft and that includes two faces/rings that are rotatable relative to one another and that utilize a liquid for lubrication. In some cases, lubricant that leaks between the rings is used to lubricate the back-up/containment seal.

Figure 1:
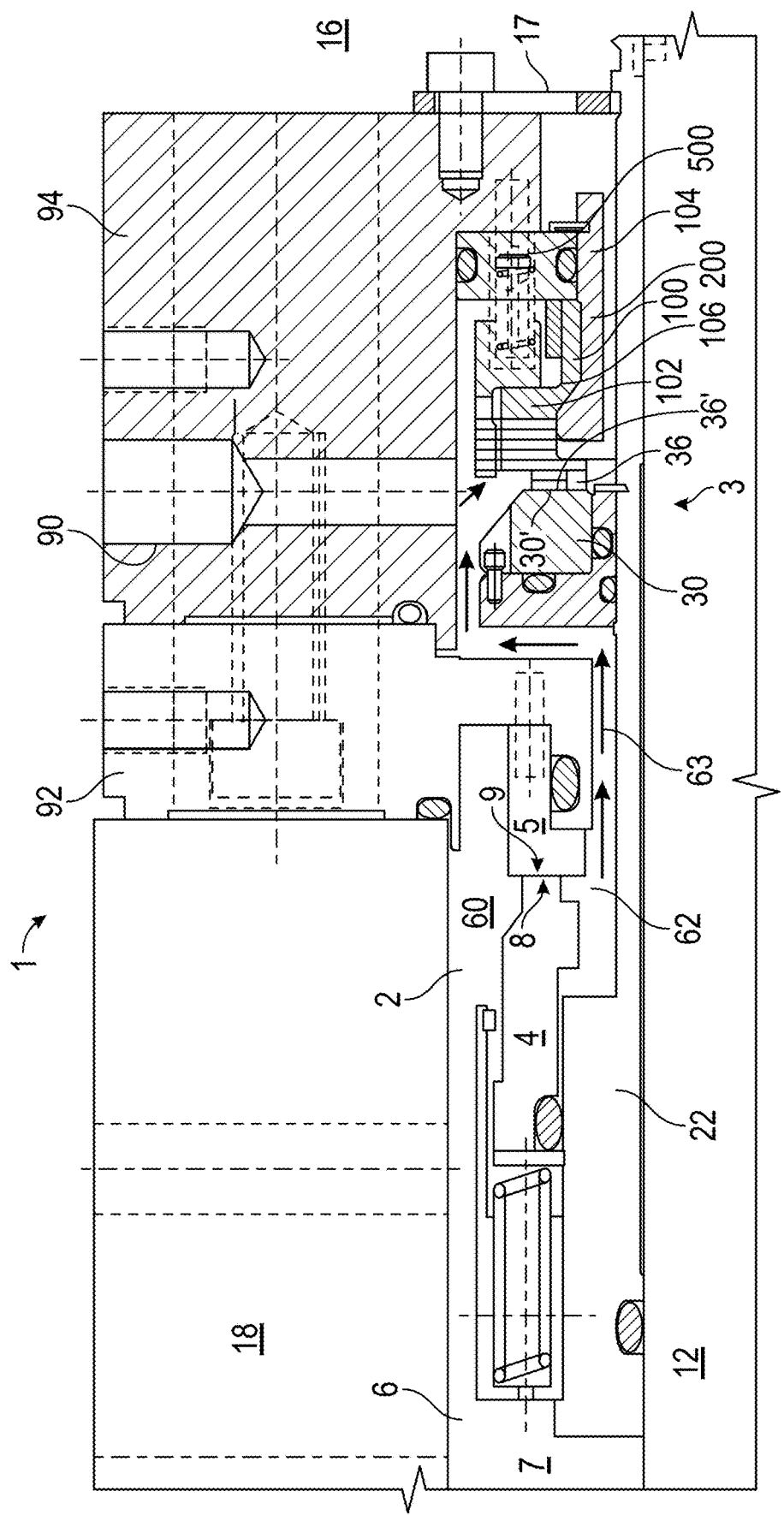
FIG. 1 is a cross-sectional view depicting a portion of a seal assembly that includes two seals including a primary seal formed as contacting O-ring pusher type seal and second or containment seal formed as a non-pusher seal that includes non-collapsible flexible sealing membrane.

The lubricant can be conducted from the primary seal into the contacting containment seal and will cause the faces of primary and mating rings of that seal to slide and serve as long-running back-up Referring now to FIG. 1, illustrated of an embodiment of mechanical seal assembly 1 according to one embodiment. The mechanical seal assembly includes first and second seals, 2, 3. As shown, a first seal 2 is arranged so that it located inboard for the second seal 3 of FIG. 1. The terms first and second can be replaced with terms primary and containment or back-up, respectively. It shall be understood that include instances the first and second seals can the same or similar to one another. For example, in FIG. 1, the first seal 2 may be referred to as primary seal and the second seal 2 referred to as a containment seal. In some instances, the second seal can be used by itself and in such a case may be referred to as first seal.

Referring back to FIG. 1, the illustrated assembly 1 has the primary seal 2 illustrated as an O-ring type pusher seal and the containment seal 3 illustrated as a seal that includes an annular flexible sealing membrane 100. Of course, the first seal 2 could also include an annular flexible sealing membrane (see, e.g., FIG. 8 below).

The assembly 1 of FIG. 1 (as well as all other assemblies of seals or individual seal shown herein) can be a free-standing assembly or can be assembled and inserted into a bore 6 formed in a rotary machine such that it surrounds a rotating shaft 12 of that machine. For simplicity, only an annular housing 18 of the machine is illustrated but this shall serve as illustration of any machine type.

The assembly 1 seals a liquid in a chamber 7 such as a pumping or process chamber. For example, in one embodiment, the chamber 7 includes a liquid process. Herein, the seal assembly 1 can provide a seal for the chamber 7 at the inboard extent of the seal assembly 1 with respect to the ambient surroundings 16.

The illustrated primary seal 2 includes two rings 4, 5 having opposing faces 8, 9 that rotate relative to one another in operation. While further explanation may be given below, the primary seal 2 in FIG. 1 operates in accordance with a typical O-ring pusher seal in particular and as a lubricated mechanical seal in general. As such, it develops a liquid film between the faces as the faces rotate relative to one another. The liquid is received from the chamber 7 as is generally held in inboard side 60 of the location where the faces 4/5 meet. As discussed above, some of the liquid will lubricate the faces and, as will all such seals, a small amount of liquid may pass (leak) between the faces during operation.

The containment seal 3 is fluid communication with the outboard side 62 of the primary seal 2. The unlabeled arrows in FIG. 1 show the path of a fluid (gas or liquid) that passes through the primary seal 2 (e.g., the path of gas/liquid on the outboard side 62 and within the assembly 1). As illustrated the primary and containment seals 2, 3 are arranged such that a containment cavity 63 is defined between them.

Normally, the containment cavity 63 operates under low pressure with small amounts of liquid present at the seal faces 30', 36'. Routine leakage from the primary seal 2 is vented through vent 90 or otherwise drained away. If the primary seal 2 fails, however, a liquid reaches the seal faces 30', 36'. The containment seal 3 prevents the pumped liquid from reaching the atmosphere 16 as it now operates at the pumped liquid pressure conditions and with the liquid lubricating seal faces 30', 36'.

In such normal operating conditions, if the typical forces and balances were applied, the faces of the containment seal would be degraded and the seal could "burn up." As the containment seal 3 is operating with less than normal lubrication (e.g., only that which passes through the primary), as compared to the primary seal 1 the containment seal 3 can have one or both of: up to a 14% lower seal balance than the first seal (4-14% in one embodiment) and lightly loaded springs with at most 10% of the face spring pressure to reduce the heat generated at interface to improve the seal life. Further, to promote sliding in cases of low lubrication, the primary ring 36 can be made of a carbon that includes some graphite (to reduce friction, and thus heat generation). The mating ring 30 can be made, for example, of Silicon Carbide.

Indeed, it has been discovered that using dry running capabilities of a seal so configured may provide for a more reliable back-up than providing another seal with contacting seal faces (e.g., liquid lubricated) similar to the primary seal 2. This is due to the fact that such a containment seal may wear out at similar rate as primary seal 2 bringing into its performance as a back-up of the primary seal in the event of primary seal failure.

In the above example, during normal operation, the pressure in the outboard side 62 of the primary seal 2 is relatively low (e.g., about 40 PSI). In the event of a failure in the primary seal, however, that pressure can rapidly increase.

One type of dry running seal is a so-called "convoluted elastomer" seal. However, under high pressure the elastomer can collapse (or at least move radially in/out) and, thus, impact the performance or predictability of such a seal when the primary collapses.

Further, pipeline pumps have high shuttling shaft movements. If an O-Ring pusher type seals is used, it has been discovered that the O-ring can abrade or otherwise deteriorate and lead to seal failure. Thus, such a seal may not be reliable as a back-up seal.

The containment seal 3 can be implemented dry running non-contacting seal that includes a non-collapsible bellows. In FIG. 1 the non-collapsible bellows is shown as the annular flexible sealing membrane 100. The annular flexible sealing membrane 100 is non-collapsible and can be supported, for example, by a stub sleeve 200. As more fully described below, because the annular flexible sealing membrane 100 does not have a relative motion against stub sleeve 200, it does not wear out like the tradition O-Rings.

In this context (and as more fully shown below) the containment seal 3 includes a primary ring 36 and a mating ring 30. The primary ring 36 is axially shiftable relative to the rotating shaft 12 and the mating ring 30 is axially fixable relative to the rotating shaft 12. In one embodiment, the primary ring 36 can be made of a carbon that includes some graphite as described above and the mating ring 30 can be made, for example, of Silicon Carbide.

A biasing mechanism 500 (e.g., a spring) urges the primary ring 36 toward the mating ring 30. The annular flexible sealing membrane 100 illustrated in FIG. 1 and further discussed below includes a flange portion 102 disposed at least partially between the biasing mechanism 500 and the primary ring 36, a coaxial portion 104 that is axially fixable relative to the shaft 12 and a flexible connection portion 106 that connects the flange portion 102 to the coaxial portion 104. Further details of the annular flexible sealing membrane 100 are provided below.

In the event that the primary seal 2 fails, a liquid will be present on the outboard side 62 of the primary seal 2 (i.e., the containment cavity 63 will be filled with a liquid). In such a case, the biasing mechanism 500 will force the faces 36', 30' together and the secondary seal 3 will operate as a contacting seal.

As illustrated, the seal assembly 1 is disposed in the bore 6 formed in the annular housing 18. In more detail, an annular sleeve member 22 is fixedly attached to the shaft 12 and rotates therewith. In the example shown in FIG. 1, regarding the primary seal 2, the first or primary ring 4 is carried on the annular sleeve 22 and the second or mating ring 5 is carried by a carrier ring 92 that, in operation, can be fixedly attached to the annular housing 18. In this example, a primary or first seal biasing mechanism urges the primary and secondary rings 4, 5 of the primary seal together. In particular, the primary or first seal biasing mechanism is connected to the primary ring 4 and urges it towards the mating ring 5. Of course, this configuration could be reversed without departing from the teachings herein.

A containment seal carrier 94 carries the primary ring 36 of the secondary seal as well as the stub 200, the biasing mechanism 500 and annular flexible sealing membrane 100. The containment seal carrier 94 can be referred to as gland plate and may be the same or similar to the gland plate 20 described below. Similar to the primary ring 4, the mating ring 30 of the containment seal 3 is carried by and rotates with the annular sleeve 22. The containment seal carrier 94 and the carrier ring 92 can be joined together to form a cartridge in this and other embodiments. The cartridge so formed can be connected to the annular housing 18 in this and other embodiments. In some instances, the cartridge can include an end plate 17 that joins the containment seal carrier 94 to the annular sleeve member 22. The cartridge can define the containment cavity 63 in one embodiment.

A more detailed example of a seal that includes an annular flexible sealing membrane 100 will now be described. The description will include a version of such a seal that while it may have different looking primary and mating rings than the containment seal 3 of FIG. 1, the same principles apply. It should be noted, however, that the containment seal 3 of FIG. 1 does not include an anti-extrusion ring. This does not mean that such could not be included in the containment seal 3 of FIG. 1 but, rather that it can be omitted. This is true because during normal operation the containment seal 3 of FIG. 1 operates at a relatively low pressure and it is assumed that the pump or other machine will be shutting down if the primary seal 2 fails (e.g., when the pressure presented to the containment seal 3 increases). In one embodiment, only the containment seal is arranged and configured as now described. In another, both the primary and containment seals can be so arranged and configured.

Figure 2:
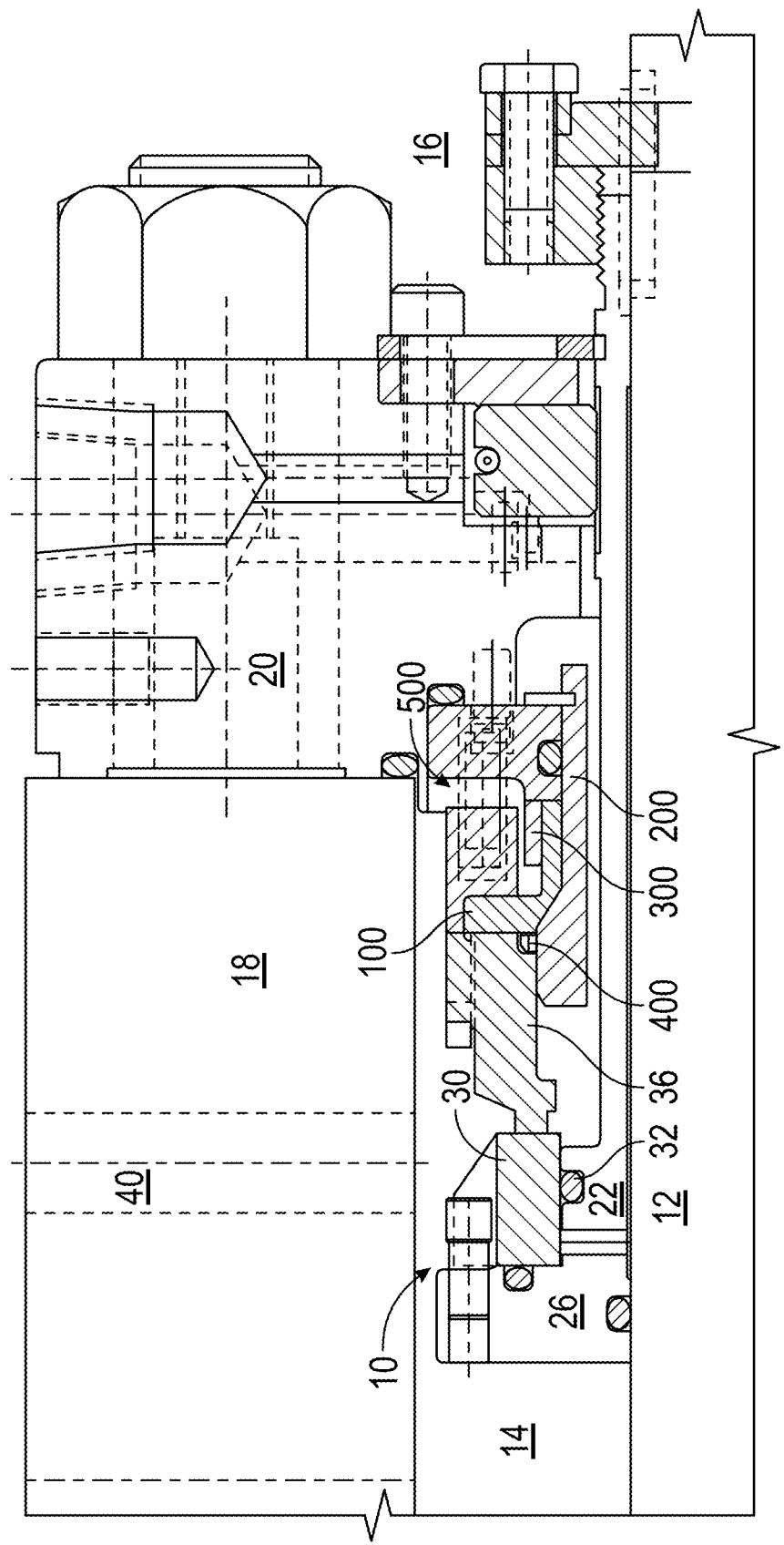
FIG. 2 is a cross-sectional view depicting a portion of a seal assembly that includes non-collapsible flexible sealing membrane according to an embodiment.
Figure 3:
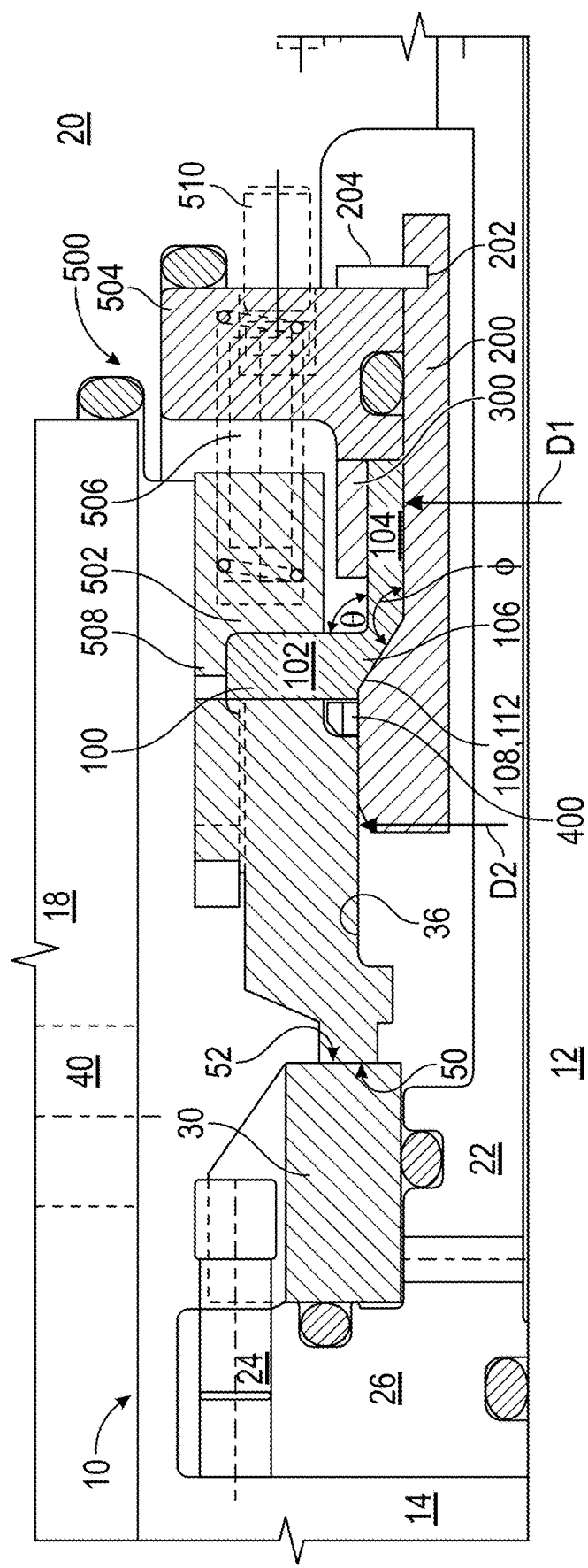
FIG. 3 is a cross-sectional view depicting a detail of the seal assembly of FIG. 2 according to an embodiment.

FIGS. 2 and 3 are broad and detail (respectively) cross-sectional views depicting a portion of a seal assembly 10 including a flexible, non-collapsible, sealing membrane 100 depicted in conjunction with an article of rotary shaft equipment such as a pump, mixer, blender, agitator, compressor, blower, fan, or the like, according to an embodiment of the present disclosure.

As is common for seal assemblies of this type, seal assembly 10 can seal a rotating, axially extending, shaft 12 of an article of rotary shaft equipment. Seal assembly 10 can provide a seal for the process chamber 14 at the inboard extent of the seal assembly 10 with respect to the ambient surroundings 16. With reference again to FIG. 1, the skilled artisan will realize that the process chamber 14 can be either the chamber 7 (in the event only one seal is provided) or the containment chamber 63 described in FIG. 1.

The seal assembly 10 can be arranged coaxial of the shaft 12 in a bore defined by an annular housing 18 coaxial of shaft 12. Various stationary (or non-rotating) components of seal assembly 10 can be operably coupled to housing 18, or a gland plate 20, which is in turn also operably coupled to housing 18.

Various rotating components can be operably coupled to shaft 12, for rotation therewith. An annular sleeve member 22 is secured to the shaft 12 for rotation therewith. An annular flange formation 26 extends radially outwardly of the sleeve member 22 at the end thereof adjacent the process chamber 14. A plurality of annularly spaced pins 24 can extend axially through bores in sleeve flange 26.

An axially fixed seal ring 30 (or mating ring) is mounted on the face of sleeve flange 26 remote from the process chamber 14, for rotation therewith. Annular O-ring 32 provides a resilient secondary seal between sleeve member 22 and axially fixed seal ring 30. In embodiments, more or fewer secondary sealing O-rings may be present. Axially fixed seal ring 30 includes outboard sealing face 50.

An axially shiftable seal ring 36 (or primary ring) is arranged outboard and adjacent to axially fixed seal ring 30. The axially shiftable seal ring 36 includes an inboard sealing face 52. The inboard sealing face 52 abuts the outboard sealing face 50. Sealing faces 50, 52 can correspond to the sealing faces 30', 36' from FIG. 1.

While, as depicted and described, the axially shiftable seal ring 36 is stationary and the axially fixed seal ring 30 is rotatable, in embodiments, the relative axial movement can be provided by either the rotating or stationary seal ring.

When used as a primary or single seal, an optional passage 40 can be defined within housing 18 and/or gland plate 20 to provide a sealing lubricant (not shown) to sealing faces 50 and 52. When used as a containment seal, the passage can be a vent such as vent 90 described above.

The annular bellows, or sealing membrane 100, can present a generally L-shaped cross-section, comprising a first, generally radially outward extending, flange portion 102 and a second, generally axially outboard extending, coaxial portion 104. The flange portion 102 and the coaxial portion 104 can be operably coupled by a flexible connecting portion 106. An inboard face of the flange portion 102 can abut and outboard face of axially shiftable seal ring 36, creating a pressure tight seal. The coaxial portion 104 is substantially or entirely radially inward of the balance diameter of the seal, where the pressure differential across the seal is the greatest. The flexible connecting portion 106 can present an angular facet 108 at a radially inward side and a connecting angle θ between flange portion 102 and coaxial portion 104 at a radially outward side. In embodiments, angle θ can be approximately ninety degrees, though other angles may also be used. The flexible connecting portion 106 can present a thinner cross section than flange portion 102 or coaxial portion 104 to enable stretching and compression.

The angular facet 108 can terminate at a corner 110 at a radially inward extent of the flexible connecting portion 106. The facet 108 can present an angle 4, relative to the axial axis of between about 100° to about 150°. The sealing member 100 is non-collapsible and can comprise a flexible material. Example flexible materials include elastomers such as nitrile, fluoreslastomer, and ethylene propylene rubbers, though other materials can be used.

The coaxial portion 104 can be fixed to an annular stub sleeve 200 by an annular band 300. The stub sleeve 200 has a first outer diameter D1, a second outer diameter D2 and an angled surface 112 connecting the first outer diameter to the second outer diameter. D2 is greater than D1. Radially outward directed faces (D1, angled surface 112 and D2) of stub sleeve 200 can abut coaxial portion 104, facet 108, and axially shiftable seal ring 36, respectively. In this manner, if the event of a pressure spike, the stub sleeve 200 provides a rigid support for the annular flexible sealing membrane 200 so that it does not collapse in the manner of a convoluted elastomer as described above.

The stub sleeve 200 can present groove 202 to receive snap ring 204 to locate stub sleeve axially relative to a carrier 504 (discussed below). The carrier 504 can be attached, for example, to the containment seal carrier 94 of FIG. 1. In embodiments, the stub sleeve 200 can be located radially by a snap ring 204, hydraulic pressure, or interference fit with the carrier 504 (discussed below) or other components of seal assembly 10. The stub sleeve 200, band 300, and the snap ring 204 can comprise steel or stainless steel in embodiments.

The annular anti-extrusion ring 400 can be present in an annular groove of axially shiftable seal ring 36 and abut axially shiftable seal ring 36, stub sleeve 200, and sealing member 100. The annular anti-extrusion ring 400 can comprise a harder elastomer than sealing membrane 100, such as a 50 to 55 (Shore D) durometer carbon filled polytetrafluoroethylene (PTFE). Because extrusion is most likely at the balance diameter of the seal, the inner diameter of anti-extrusion ring 400 can be arranged at the balance diameter of the seal. As discussed above, in some embodiments, this ring can be omitted. An example of such an embodiment is shown in FIG. 1 by containment seal 3.

The biasing mechanism 500 can abut the flange portion 102. The biasing mechanism 500 can comprise an axially shiftable annular retainer 502, the axially fixed carrier 504, and one or more biasing members 506 spanning therebetween. The retainer 502 can be arranged proximate flange portion 102. The retainer 504 can present a protrusion 508, extending axially inboard outside the outer diameter of the flange portion 102. The protrusion 508 can be radially spaced from the outer face of the flange portion 102. The carrier 504 can be axially and rotationally fixed to the gland plate 20 by one or more pins 510, though other fixation mechanisms can be used. The biasing members 506 can comprise one or more radially spaced springs, though other biasing mechanisms known in the art can be used. In embodiments, one or both of the retainer 502 and the carrier 504 can include bores adapted to house at least part of each biasing member 506, such that biasing members 506 are partially located within retainer 502 and carrier 504.

Those of ordinary skill in the art will appreciate that the arrangements depicted in FIGS. 2 and 3 include components that may be altered or eliminated in other seal assembly embodiments. In addition, more or fewer components may be incorporated in other embodiments of seal assemblies according to the present disclosure.

In operation, rotation of shaft 12 can drive sleeve member 22 and axially fixed seal ring 30 to rotate relative to axially shiftable seal ring 36. If being used as a primary seal, seal lubricant can be provided to seal 10 through from the chamber 14 or through optional passage 40 to lubricate seal sealing faces 50 and 52 and to create a pressure gradient across sealing faces 50 and 52.

The pressure gradient and hydraulic pressure created by the relative rotation of sealing faces 50 and 52 can result in an opening force, urging axially shiftable seal ring 36 axially outboard from axially fixed seal ring 30. Similarly, a closing force can be provided by biasing mechanism 500, urging axially shiftable seal ring 36 inboard toward axially fixed seal ring 30.

Those of ordinary skill in the art will appreciate that the closing force at a seal face interface can be calculated from the closing area (AC), the opening area (AO), the outer diameter of the stationary ring face (OD), the inner diameter of the stationary ring face (ID) and the balance diameter (BD), as detailed below:

$$\text{Closing Force} = \left(\frac{AC}{AO}\right) \times \text{Hydraulic Pressure}$$

$$\text{where } AC = \frac{OD^2 - BD^2}{OD^2 - ID^2}$$

Flange portion 102 can shift axially and radially based on the relative closing and opening forces, and the axial translation of the shaft itself, such that the closing force applied to axially shiftable seal ring 36 is constant, regardless of the position of flange portion 102.

Figure 4A:
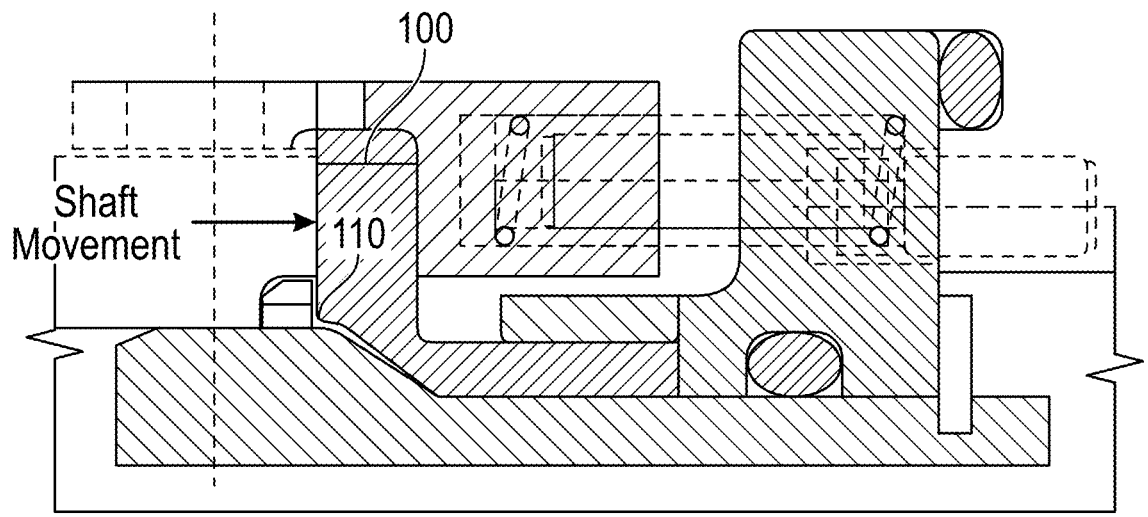
FIGS. 4A and 4B shows a cross section of a portion of the seal assembly of FIGS. 2 and 3 as the shaft moves.
Figure 4B:
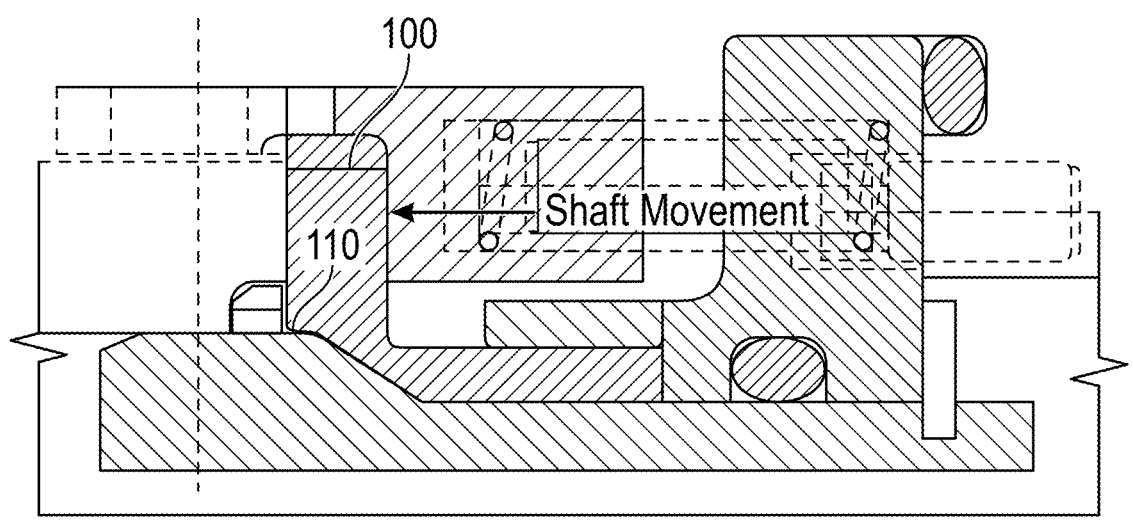

FIGS. 4A and 4B are detail views of an embodiment of a seal assembly, in which some effects of axial movement on sealing membrane 100 can be seen. An axially outward translation of the shaft can be transmitted to the flange portion 102 via sleeve 22, axially fixed ring 30, and axially shiftable seal ring 36. This movement can cause the flange portion 102 to compress slightly and distort at an angle, preventing any changes in the opening and closing forces at the seal interface. In particular, as depicted, axially outboard translation of the axially shiftable seal ring 36 can transmit the opening force to the flange portion 102, causing flange portion 102 to be translated axially outboard and radially outward away from the stub sleeve 200 as depicted in FIG. 4A. Conversely, an axially inward translation of the shaft 12 can relieve pressure on the flange portion 102, enabling the flange portion 102 to translate axially inboard and radially inward against the stub sleeve 200. This contact between sealing membrane and stub sleeve 200 can further minimize leakage.

A high-pressure gradient across sealing faces 50 and 52 can encourage partial extrusion of flexible sealing membrane 100 between stub sleeve 200 and axially shiftable seal ring 36. This can be resisted by the harder material of anti-extrusion ring 400.

Over the life of the seal, sealing faces 50 and 52 will wear relative to each other. Because sealing membrane 100 can move inboard, toward chamber 14, and outward, away from chamber 14, over the life of the seal, it can help to maintain an appropriate seal gap. Hydraulic pressure can keep the axially shiftable seal ring 36 from contacting axially fixed seal ring 30 while the flange portion 102 of sealing membrane 100 moves inboard. The hydraulic pressure can keep the other components, such as stub sleeve 200, in place. Further, because the coaxial portion 104 is below the balance diameter of the seal, the hydraulic pressure applied to coaxial portion 104 will not affect the closing force, or the balance diameter itself. Biasing mechanism 500 can be used to set the working height of the seal and compress flange portion 102 of sealing membrane 100 against an end of the axially shiftable seal ring 36 (distal in relation to the process chamber, and opposite sealing face 52) of the axially shiftable seal ring 36 (creating a seal) when no hydraulic pressure is present. Because the vertical force is not altered by the axial movement of sealing membrane 100, and the closing force at the interface of sealing faces 50 and 52 is not affected. Herein, the spring mechanism of the second seal 3 can be can from 1% to most 10% of the spring pressure as that provided by the spring mechanism in the first seal 2.

The maximum axially outboard translation of flange portion 102 and retainer 502 can be defined by a gap provided between an outboard face of retainer 502 and an inboard face of carrier 504, or by the compression limit of biasing members 506. In embodiments, translation of flange portion 102 can be limited to prevent bunching, folding over, or other collapsing of sealing member 100 at connecting portion 106. In one embodiment, translation of flange portion 102 can be limited to maintain angles θ or φ.

In addition, because flange portion 102 is held in a radially extending orientation by axially shiftable seal ring 36 and retainer 502, coaxial portion 104 is held in an axially extending orientation by stub sleeve 200 and band 300, sealing member 100 is non-collapsible.

Figure 5:
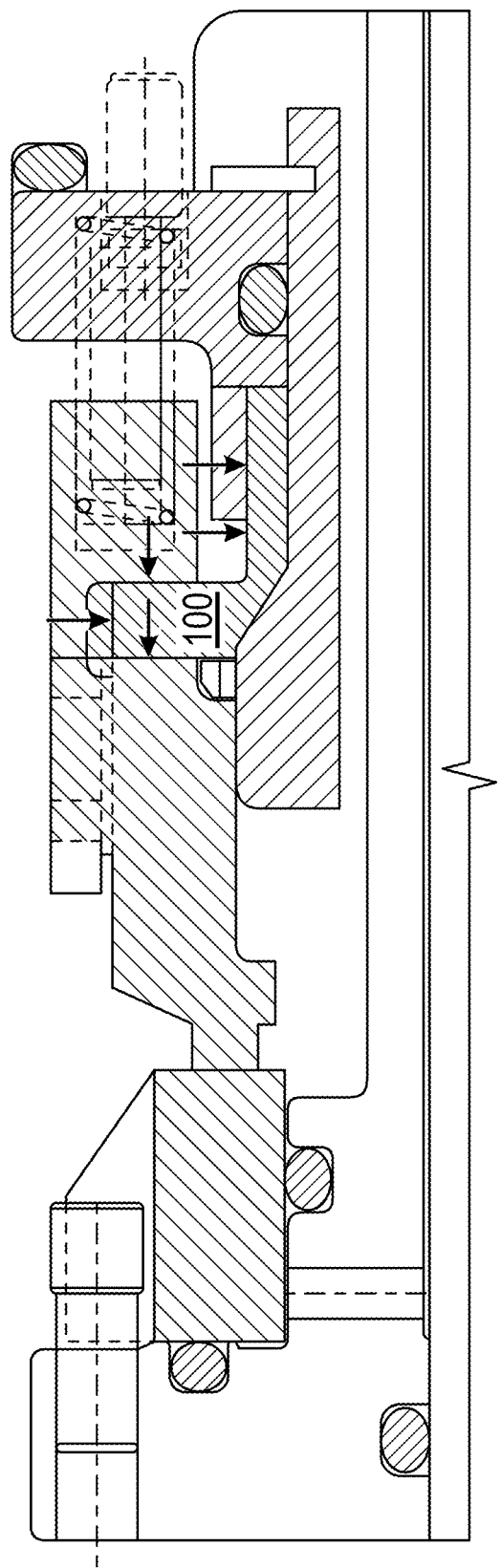
FIG. 5 is a cross-sectional view depicting a portion of the seal assembly of FIGS. 2 and 3.

As can be seen in FIG. 5, the angle θ between flange portion 102 and coaxial portion 104 of sealing membrane 100 provides for directional control of the forces acting on stub sleeve 200 and axially shiftable seal ring 36. Coaxial portion 104 allows flexibility of flange portion 102 and connecting portion 106 while flange portion 102 is under pressure at the balance diameter of the seal.

Figure 6:
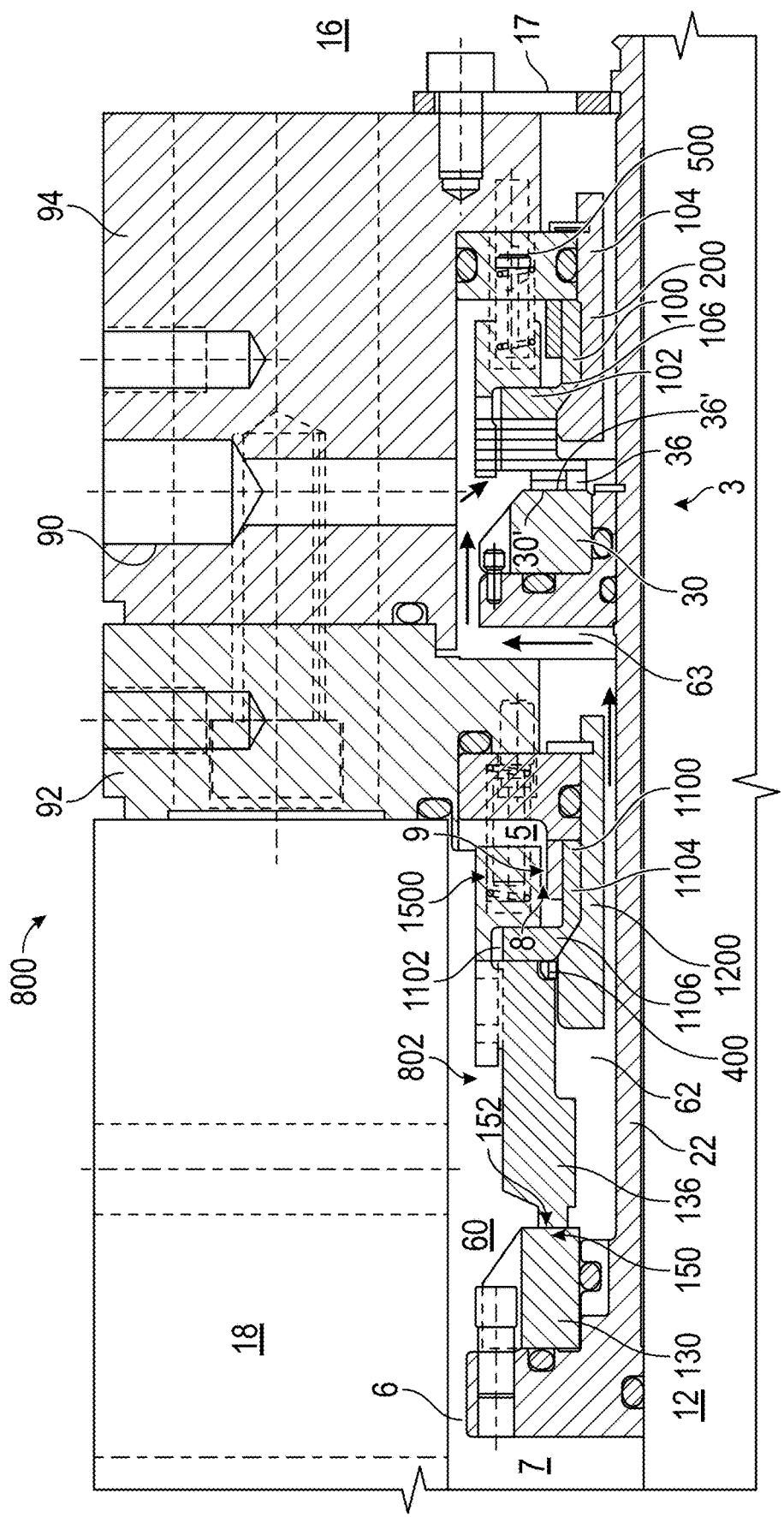
FIG. 6 is a cross-sectional view depicting a portion of a seal assembly that includes two seals including a first or primary seal and a second or containment seal that are both formed as non-pusher seals that includes non-collapsible flexible sealing membrane.

With reference now to FIG. 6, another embodiment is illustrated. In this embodiment, a seal assembly 800 is shown and includes 2 seals, both of which include an annular flexible sealing membrane. The primary seal 802 in this embodiment is substantially the same as the seal described above with respect to FIGS. 2-5 and includes the optional extrusion ring 400. The secondary seal 3 is the same as that described above in FIG. 1.

As can be seen in FIG. 8, the seal assembly 800 is adapted for arrangement around the rotating shaft 12. The shaft can be a shaft of a pump or any another type of rotating machine. The assembly 800 includes a first or primary seal 802 and a second or containment seal 3. The first seal 802 includes a first primary ring 136 and a first mating ring 130 that includes sealing faces 152, 150, respectively. The first primary ring 136 is axially shiftable relative to the rotating shaft 12 and the first mating ring 130 is axially fixable relative to the rotating shaft 12.

The primary seal 802 includes a first biasing mechanism 1500 that urges the first primary ring 136 toward the first mating ring 150. The primary seal 802 also includes a first annular flexible sealing membrane 1100 that a first flange portion 1102 disposed at least partially between the first biasing mechanism 1500 and the first primary ring 136, a first coaxial portion 1104 that is axially fixable relative to the shaft 12, and a first flexible connection portion 106 positioned within a radially inward extent of the first flange portion 1102 and connecting the first flange portion 1102 to the first coaxial portion 1104. In operation, wherein in operation a liquid film is formed between the first primary ring 136 and the first mating ring 130. The film is formed, in one embodiment, from a liquid in the chamber 7. The chamber 7 can be in a pump in one embodiment.

Operation of the containment seal 3 is described above with respect to FIG. 1 and reference is made thereto. In one embodiment, the containment seal can be referred to as a second seal and is in fluid communication with the containment cavity 63. This second seal 3 includes that includes a second primary ring 36 and a second mating ring 30. The second primary ring 36 is axially shiftable relative to the rotating shaft 12 and the second mating ring 30 is axially fixable relative to the rotating shaft 12. The second seal 3 also includes a second biasing mechanism 500 that urges the second primary ring 36 toward the second mating ring 30. The second primary ring 36 includes face 36' and second mating ring include face 30'. The rings can be made of the materials as described above and the ratio of closing forces provided by the biasing mechanisms in FIG. 6 can also be as above described.

The second seal includes a second annular flexible sealing membrane 100 that includes: a second flange portion 102 disposed at least partially between the second biasing mechanism 500 and the second primary ring 36; a second coaxial portion 104 that is axially fixable relative to the shaft 12; and a second flexible connection portion 106 positioned within a radially inward extent of the second flange portion 102 and connecting the second flange portion 102 to the second coaxial portion 104

As illustrated, the seal assembly 800, similar to FIG. 1 above, is disposed in the bore 6 formed in the annular housing 18. In more detail, an annular sleeve member 22 is fixedly attached to the shaft 12 and rotates therewith. In the example shown in FIG. 8, regarding the primary seal 802, the first or primary ring 136 is carried on the annular sleeve 22 and the second or mating ring 130 is carried by a carrier ring 92 that, in operation, can be fixedly attached to the annular housing 18.

As above, a containment seal carrier 94 carries the primary ring 36 of the secondary seal 3 as well as the stub 200, the biasing mechanism 500 and annular flexible sealing membrane 100.

The containment seal carrier 94 and the carrier ring 92 can be joined together to form a cartridge in this and other embodiments. The cartridge so formed can be connected to the annular housing 18 in this and other embodiments. In some instances, the cartridge can include and end plate 17 that joins the containment seal carrier 94 to the annular sleeve member 22. The cartridge can define the containment cavity 63 in one embodiment.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A mechanical seal assembly adapted for arrangement around a rotating shaft of a pump, the seal assembly comprising:
   a first seal;
   a second seal, wherein the first and second seal are arranged such that a containment cavity is defined within the seal assembly and between the first and second seals;
   wherein the first seal includes:
      a first primary ring and a first mating ring, the first primary ring being axially shiftable relative to the rotating shaft and the first mating ring being axially fixable relative to the rotating shaft;
      a first biasing mechanism that urges the first primary ring toward the first mating ring, the first biasing means providing a first biasing force; and
      a first annular flexible sealing membrane that includes:
         a first flange portion disposed at least partially between the first biasing mechanism and the first primary ring;
         a first coaxial portion that is axially fixable relative to the shaft; and
         a first flexible connection portion positioned within a radially inward extent of the first flange portion and connecting the first flange portion to the first coaxial portion;
   wherein in operation the first biasing means applies the first biasing force to the first primary ring through the first flange portion to urge the first primary ring toward the first mating ring; and
   wherein the second seal is in fluid communication with the containment cavity and includes:
      a second primary ring and a second mating ring, the second primary ring being axially shiftable relative to the rotating shaft and the second mating ring being axially fixable relative to the rotating shaft;
      a second biasing mechanism that urges the second primary ring toward the second mating ring, the second biasing means providing a second biasing force; and
      a second annular flexible sealing membrane that includes:
         a second flange portion disposed at least partially between the second biasing mechanism and the second primary ring;
         a second coaxial portion that is axially fixable relative to the shaft; and
         a second flexible connection portion positioned within a radially inward extent of the second flange portion and connecting the second flange portion to the second coaxial portion;
   wherein in operation the second biasing means applies the second biasing force to the second primary ring through the second flange portion to urge the second primary ring toward the second mating ring;
   wherein the second biasing force is less than 10% of the first biasing force.

2. The assembly of claim 1, wherein the second seal has a lower seal balance than a seal balance of the first seal.

3. The assembly of claim 2, wherein the balance of the second seal is between 4 and 14% lower than the first seal.

4. The assembly of claim 1, wherein the first and second seals are disposed in a cartridge.

5. The assembly of claim 4, wherein the cartridge is at least partially disposed in the pump.

6. The assembly of claim 5, wherein the second seal is in fluid communication with the first seal within the cartridge.

7. The assembly of claim 1, wherein the second coaxial portion is arrangable at a diameter within the balance diameter of the seal assembly.

8. The assembly of claim 1, wherein, in operation, axial translation of the rotating shaft relative to the second biasing mechanism urges the second flange portion to shift axially inboard and radially inward relative to the second coaxial portion.

9. The assembly of claim 1, wherein, in operation, axial translation of the rotating shaft relative to the second biasing mechanism urges the second flange portion to shift axially outboard and radially outward relative to the second coaxial portion.

10. A mechanical seal assembly adapted for arrangement around a rotating shaft of a pump, the seal assembly comprising:
   a first seal;
   a second seal, wherein the first and second seal are arranged such that a containment cavity is defined within the seal assembly and between the first and second seals;
   wherein the first seal includes:
      a first primary ring and a first mating ring, the first primary ring being axially shiftable relative to the rotating shaft and the first mating ring being axially fixable relative to the rotating shaft;
      a first biasing mechanism that urges the first primary ring toward the first mating ring, the first biasing means providing a first biasing force; and
      a first annular flexible sealing membrane that includes:
         a first flange portion disposed at least partially between the first biasing mechanism and the first primary ring;
         a first coaxial portion that is axially fixable relative to the shaft; and
         a first flexible connection portion positioned within a radially inward extent of the first flange portion and connecting the first flange portion to the first coaxial portion;

wherein in operation the first biasing means applies the first biasing force to the first primary ring through the first flange portion to urge the first primary ring toward the first mating ring; and wherein the second seal is in fluid communication with the containment cavity, the second seal including:
- a second primary ring and a second mating ring, the second primary ring being axially shiftable relative to the rotating shaft and the second mating ring being axially fixable relative to the rotating shaft;
- a second biasing mechanism that urges the second primary ring toward the second mating ring, the second biasing means providing a second biasing force; and
- a second annular flexible sealing membrane that includes:
  - a second flange portion disposed at least partially between the second biasing mechanism and the second primary ring;
  - a second coaxial portion that is axially fixable relative to the shaft; and
  - a second flexible connection portion positioned within a radially inward extent of the second flange portion and connecting the second flange portion to the second coaxial portion;

wherein in operation the second biasing means applies the second biasing force to the second primary ring through the second flange portion to urge the second primary ring toward the second mating ring;

wherein the second seal has a seal balance that is between 4 and 14% lower than a seal balance of the first seal.

11. The assembly of claim 10, wherein the first and second seals are disposed in a cartridge.

12. The assembly of claim 11, wherein the cartridge is at least partially disposed in the pump.

13. The assembly of claim 12, wherein the second seal is in fluid communication with the first seal within the cartridge.

14. The assembly of claim 10, wherein the second coaxial portion is arrangable at a diameter within the balance diameter of the seal assembly.

* * * * *